Aug. 9, 1960     W. E. TODD     2,948,385

SCREW CONVEYOR APPARATUS

Filed April 20, 1956

WILLIAM E. TODD
INVENTOR.

BY R. G. Story

ATTORNEY

United States Patent Office 2,948,385
Patented Aug. 9, 1960

2,948,385

SCREW CONVEYOR APPARATUS

William E. Todd, South Norfolk, Va., assignor to Swift & Company, Chicago, Ill., a corporation of Illinois Filed Apr. 20, 1956, Ser. No. 579,633

6 Claims. (Cl. 198—213)

This invention relates to an improvement in transferring material through a conduit, particularly an improvement for screw conveyors transporting material through a partially closed or completely closed flexible conduit. More specifically, this invention is directed to an apparatus whereby a flexible conduit for a screw conveyor is subjected to cyclic distortions thereby cracking, shearing and shattering material deposits on the inner surface of said conduit.

Generally speaking, when material either granular, pulverant, plastic or semi-solid is transferred through a conduit, the material adjacent the conduit wall tends to accumulate and become immobile due to frictional, compressive, and adhesive or cohesive phenomena. This problem is aggravated where a screw member within the conduit provides the motive force to advance the material. In such an instance accumulations also appear on the screw surface; and in extreme but not infrequent instances, the deposits on both conduit and screw surfaces accumulate to such an extent as to cause complete stoppage of the material and sometimes mechanical failure and breakdown of the various parts of the equipment.

The difficulties arising due to accumulations within conveyor conduits and around screw conveyors have been attacked in various ways. Heretofore, these problems have been reduced by employing special screw member designs wherein the screw flights have lateral projections that cut and groove the deposits on the conduit wall, or by vibrating the conduit and/or screw to minimize the tendency for granular or pulverant material to form deposits. Still another method and apparatus already known is the use of an additional member within the conduit to scrape the screw, or move longitudinally in the direction of flow and assist the continued advancement of the material.

Obviously, while these provisions bear merit, they do not fully meet all of the aspects of the problem encountered and effectively overcome them.

Therefore, an object of this invention is to improve over known methods and apparatus and provide a more efficient means to prevent accumulations and deposits within conveyor conduits used in transferring many kinds of materials whether they be granular, pulverant, plastic, or semi-fluid.

Another object is to reduce clogging and choking of screw conveyor systems and provide a conveyor efficient in action, by avoiding jamming of the conveyor flights within the conduit due to accumulation and packing of material between the screw and conduit.

Additional objects and advantages of the invention will become apparent in the following description and drawings.

Generally, this invention contemplates periodic and cyclic distortion of flexible conduit walls at spaced locations, to thereby flex the inner surface of the conduit and cause any deposits thereon to be subjected to internal stresses and strains, and to cause shearing forces which will result in the destruction and release of said deposits. Apparatus for this purpose is basically a series of flexor elements which are caused to periodically contact, displace, and release the outside of the flexible conduit wall at a plurality of points.

Figure 1:
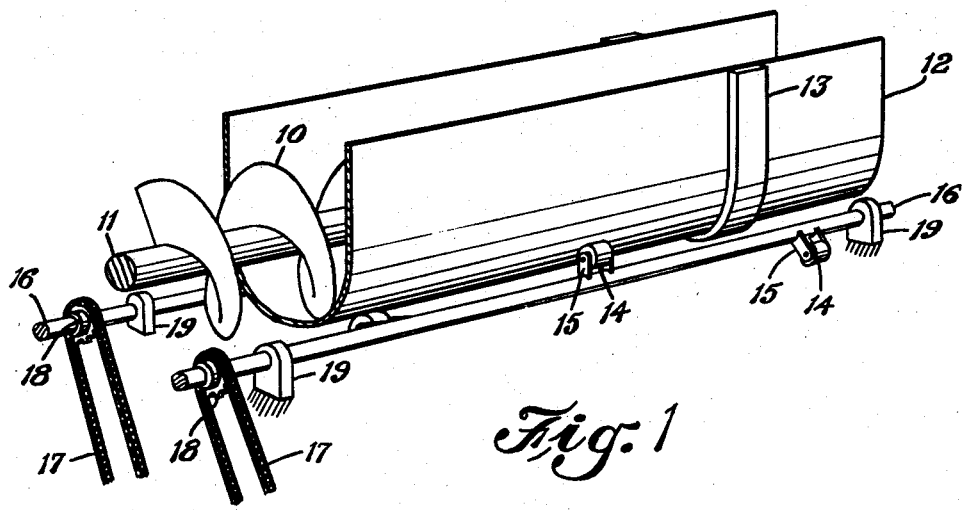
Figure 1 is a section of a screw conveyor apparatus showing an embodiment of the present invention.
Figure 2:
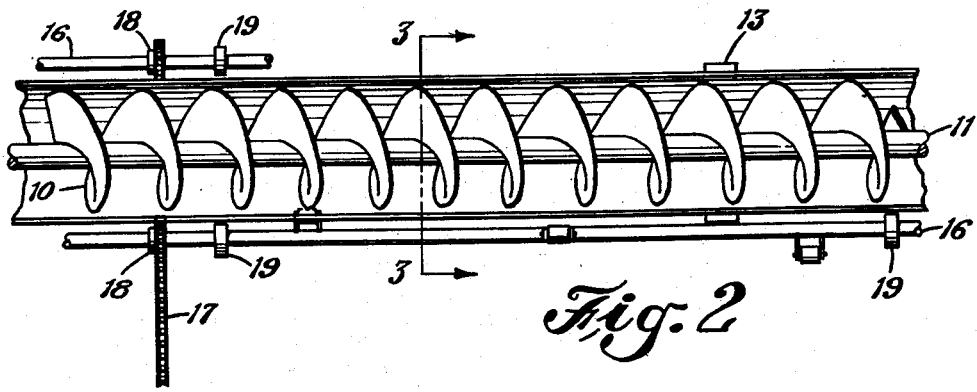
Figure 2 is a plain view of the embodiment shown in Figure 1.
Figure 3:
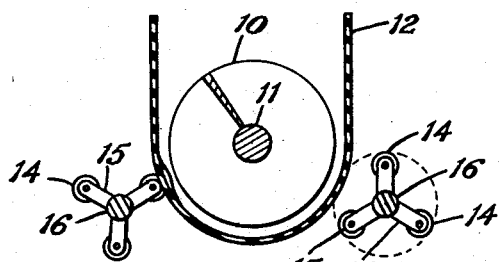
Figure 3 is a section view of the same device taken at line 3—3 of Figure 2.

Referring now to the drawings wherein like characters refer to like parts throughout: 10 represents screw conveyor flights developed on shaft 11 which is housed in a flexible conduit 12 and suitably supported on a frame, not shown. Any suitable power means may be coupled to the screw. The conduit should be formed of a suitable flexible type material, having wear and strength characteristics adequate to handle the fluent material being transported, such as flexible reinforced rubber, flexible plastic, or a woven metal.

Rigid reinforcing members 13 may be necessary to properly suspend and/or join sections of the conveyor at spaced intervals. The flexor apparatus comprises generally a plurality of roller members 14 having their axes rotatably mounted in supports 15 that, in turn, are preferably fixed in helical progression about rotatable shafts 16. These shafts are journalled in bearings 19 located at appropriate intervals to satisfactorily support shafts 16 and maintain them parallel to the conduit surface 12 so that the flexors may contact and flex the conduit wall. Means, such as drive chain 17 and sprocket 18, couple shaft 16 to a suitable power source, not illustrated, and cause the shaft to rotate thus moving the flexors through cyclic engagement with the conduit.

In operation, the screw conveyor 10 turns and forces material to move through conduit 12, with the material tending to become static and form deposits on the conduit wall. Suitable drive means 17 turn shafts 16 and bring flexor members 14 into periodic and cyclic impact with the conduit wall 12 at various locations on its surface. This impact occurs only during a portion of the rotation or movement of each flexor and consists of contact, displacement, release, and disengagement periods with respect to the conduit wall. The total displacement at any point along the conduit is never of such a degree as to cause positive interference between the conduit wall 12 and the screw flight 10; but is sufficient to disturb deposits on the inner surface through any or a combination of internal actions. Theoretically, the material is moved to a position in interference with a screw flight and is thereby sheared from the conduit wall, or the material is cracked and loosened from the wall due to the localized change in shape induced by the displacement of the conduit wall, or the change in shape of the conduit wall breaks the adhesion between said wall and the material deposit.

Obviously the flexor apparatus could take one of several forms, including solenoid or eccentric cam type actuators and the like, either operatively connected or mounted separately and individually at the desired locations along the conduit without interconnection, so long as such apparatus has the ability to flex and release the conduit wall. Additionally, the conduit wall 12 may be reinforced or guarded, at those particular areas where the flexors physically contact said wall, to reduce localized wear and prolong the life of the conduit.

Further, this invention is not necessarily limited to screw type conveyors, as it may be readily observed that the flexor devices could be adapted to operate upon other conveyor means, having a tendency to accumulate deposits, employing a conduit or trough such as gravity pneumatic, or hydraulic type conveyors.

Successful tests have been run on an eighteen inch diameter screw type conveyor twelve feet long which is used to transfer plant food of a granular, somewhat moist consistency and having a pronounced tendency to accumulate and form deposits in the conduit. A U-shaped open top conduit constructed from "Armadilo" type belt, manufactured by the Goodyear Company, encloses the conveyor; and three parallel shafts, upon which are welded 3" diameter casters (the flexor elements) at intervals of approximately thirteen and one-half inches of length and 120° circumference of the shaft, are placed outside and longitudinally adjacent the lower portion of said conduit and in such proximity as to allow the casters to displace inwardly to some extent (but not so as to interfere with the screw flights) the wall of the conduit. The three shafts are rotated at approximately 9 r.p.m. by means of a mechanical coupling consisting of sprockets, a common drive chain and a single electric motor and speed reducer.

Obviously, many modifications and variations of the invention as hereinbefore set forth may be made without departing from the spirit and scope thereof, and therefore only such limitations should be imposed as are indicated in the appended claims.

I claim:

1. The combination comprising: a conveyor conduit formed from resilient flexible material; a rotatable drive shaft mounted outside and parallel to said conduit; flexor means mounted on said drive shaft engageable with and capable of deforming said conduit at spaced locations during at least part of the rotation of said shaft; and means to rotate said drive shaft.

2. The apparatus of claim 1 wherein the flexor means comprise: rotatable members fixed in a substantially helical progression at intervals along said drive shaft.

3. The apparatus of claim 2 wherein the flexor means comprise: a plurality of independently rotatable members positioned at intervals of 120° from one another about said drive shaft.

4. A screw conveyor comprising: a screw having conveyor flights thereon, a flexible conduit at least partially enclosing the screw throughout its length, the inner surface of said conduit being spaced from the flights of said screw, mechanical flexor means disposed along the outside of said conduit adjacent a plurality of locations thereon, each of said flexor means adapted to repeatedly engage and disengage the exterior of said conduit to displace said conduit at said locations a distance less than the space normally between the inner surface of said conduit and the flights of said screw, and power means connected to said flexors to cause said flexors to distort and release said conduit.

5. A screw conveyor comprising: a screw having conveyor flights thereon, a flexible conduit at least partially enclosing the screw throughout its length, the inner surface of said conduit being spaced from the flights of said screw, a plurality of rotatable shafts along the outside of said conduit parallel to said screw, flexors extending radially from said shafts a distance sufficient to contact said conduit and displace the inner surface thereof a distance less than the space normally between said inner surface and the flights of said screw, said flexors being disposed in helical fashion about the length of said shafts to contact, displace and release said conduit at a plurality of spaced locations cyclically as said shafts rotate, and power means connected to rotate said shafts.

6. A screw conveyor comprising a screw having conveyor flights thereon, a flexible conduit at least partially enclosing the screw throughout its length, and mechanical means to periodically impact a plurality of points on the outer surface of said conduit, whereby the walls of said conduit are locally distorted at the points of impact and deposits formed within the conduit are broken.

References Cited in the file of this patent

UNITED STATES PATENTS

| | | |
|---|---|---|
| 1,539,515 | Samuelson | May 26, 1925 |
| 2,478,326 | Scarth | Aug. 9, 1949 |
| 2,697,510 | Morrison | Dec. 21, 1954 |
| 2,724,493 | Jones | Nov. 22, 1955 |

FOREIGN PATENTS

| | | |
|---|---|---|
| 484,961 | Great Britain | May 12, 1938 |